UNITED STATES PATENT OFFICE.

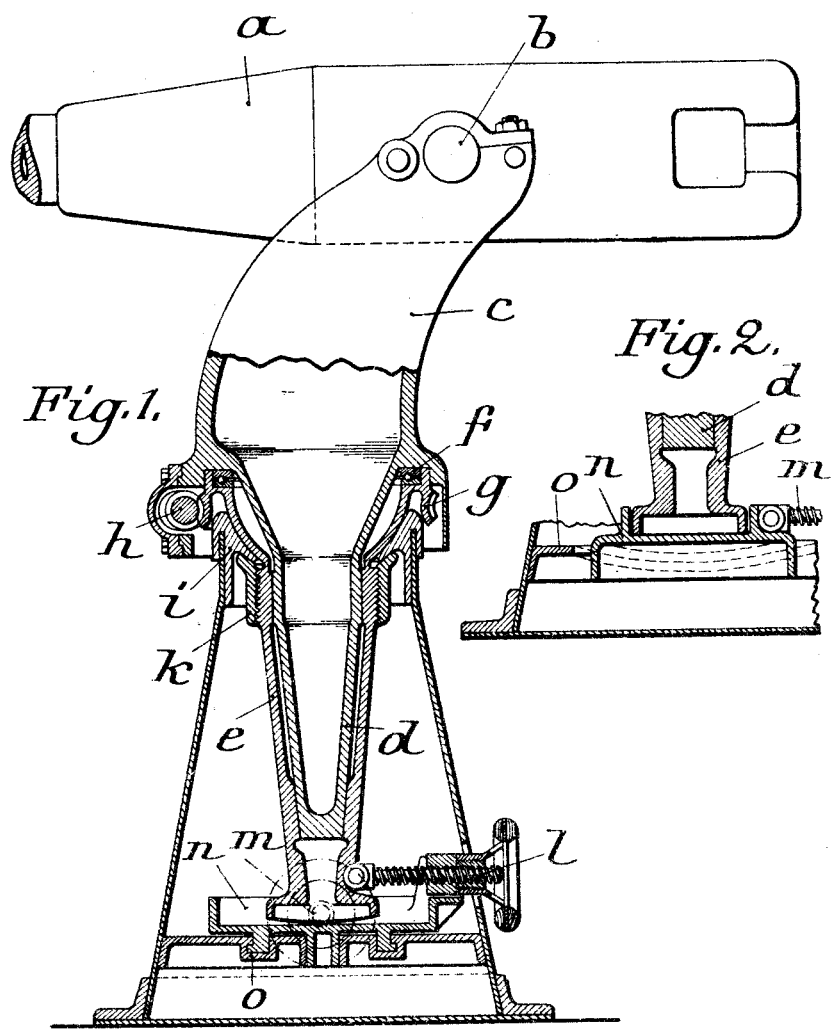

KARL VÖLLER, OF DUSSELDORF, GERMANY, ASSIGNOR TO RHEINISCHE METALL-WAAREN- UND MASCHINENFABRIK, OF DUSSELDORF-DERENDORF, GERMANY A CORPORATION OF GERMANY.

GUN-CARRIAGE MOUNTED ON A PIVOT.

1,032,251.  Specification of Letters Patent.  Patented July 9, 1912.

Application filed January 4, 1911. Serial No. 600,741.

*To all whom it may concern:*

Be it known that I, KARL VÖLLER, engineer, a subject of the German Emperor, residing at 17 Jülicherstrasse, Dusseldorf, Germany, have invented certain new and useful Improvements in Gun-Carriages Mounted on Pivots; and I do hereby declare the following to be a full, clear, and exact description of the invention, such as will enable others skilled in the art to which it appertains to make and use the same.

In the case of guns which are mounted on vehicles or vessels on a pivot, the principle adopted for guns on wheels for compensating for the inclination of the ground, has been applied by constructing the pivot in such a manner that when the vehicle or vessel is in an inclined position the axis of the pivot can be brought into a vertical position.

In one kind of gun, for example, the pivot has been constructed as a sphere which can be clamped in position in its bearing. In such a construction the clamping device must be loosened before the axis of rotation of the gun can be varied by hand.

The characteristic feature of the pivoted gun carriage constructed according to the present invention is that the pivot is suspended by a universal joint and is adjusted and fixed in position by one or more operating mechanisms.

The accompanying drawings illustrate the invention applied to a gun-carriage mounted on a middle pivot carried by a ball and socket bearing, Figure 1 being a sectional elevation and Fig. 2 a part section at a right angle to the section shown in Fig. 1.

The barrel $a$ is carried on trunnions $b$ in the carriage $c$. The lower part of the carriage is formed as a pivot $d$ which rotates in the bearing $e$. The upper part of the carriage is also supported by this bearing, a ball bearing $f$ being provided between the parts, so that when the gun is trained the carriage can be easily turned in a horizontal plane. For this purpose the bearing $e$ carries a worm wheel $g$ engaging a worm $h$ which is eccentrically mounted so that it can be turned out of engagement with the worm wheel.

The upper part of the bearing $e$ is spherically shaped and is supported in a cup $i$ carried by a pedestal. Any tendency of the bearing $e$ to rise from the cup $i$ is prevented by the nut $k$ screwed on the bearing. This ball and socket suspension of the bearing $e$ permits of the latter being turned in the pedestal in any direction.

For turning the bearing $e$ in vertical planes there are two screw spindles $l$ and $m$ placed at right angles to each other and engaging the lower part of the bearing, so that the operation of turning the latter may require as little power as possible. These spindles also serve for holding the bearing $e$ firmly in the pedestal cup $i$.

The spindle $l$ engages directly with the bearing $e$ which at its lower end is formed as a shoe guided in a carriage $n$; the latter slides in the plate $o$ of the pedestal and can be shifted by the spindle $m$ in a direction at right angles to that in which the shoe of the bearing $e$ moves. By this construction the axis of the pivot $d$ may be brought into the vertical position whatever may be the position of the vehicle or vessel.

Having now particularly described and ascertained the nature of my said invention and in what manner the same is to be performed, I declare that what I claim is:

1. A gun carriage having a depending centrally arranged pivot member, a bearing therefor, a pedestal, a universal joint from which said bearing is suspended, and means mounted on the pedestal for adjusting the bearing in different directions.

2. A gun carriage having a depending centrally arranged pivot member, a bearing therefor, a pedestal, a universal joint from which said bearing is suspended, and means mounted on the pedestal engaging the lower end of said bearing for adjusting it in different directions.

3. A gun carriage having a depending centrally arranged pivot member, a bearing therefor, a pedestal, a universal joint for said bearing, and gearing on said pedestal engaging the lower end of said bearing for adjusting it in different directions.

4. A gun carriage having a depending centrally arranged pivot member, a bearing therefor, a pedestal, a universal joint for said bearing, a sliding member for engaging the lower end of the bearing, means for adjusting said sliding member and bearing, and separate means for adjusting the bearing independently of the sliding member.

5. In a gun carriage mounted on a pivot the combination of a bearing for the pivot suspended by a universal joint, a shoe-formed foot of the bearing adapted to slide in a carriage and means for moving the foot and the last-mentioned carriage at right angles to each other.

In testimony whereof, I have signed this specification in the presence of two subscribing witnesses.

KARL VÖLLER.

Witnesses:
 HENRY HASPER,
 WOLDEMAR HAUPT.